T. H. STAFFORD.
BELT SHIPPER FOR STEP PULLEYS.
APPLICATION FILED APR. 1, 1916.
1,198,876.
Patented Sept. 19, 1916.
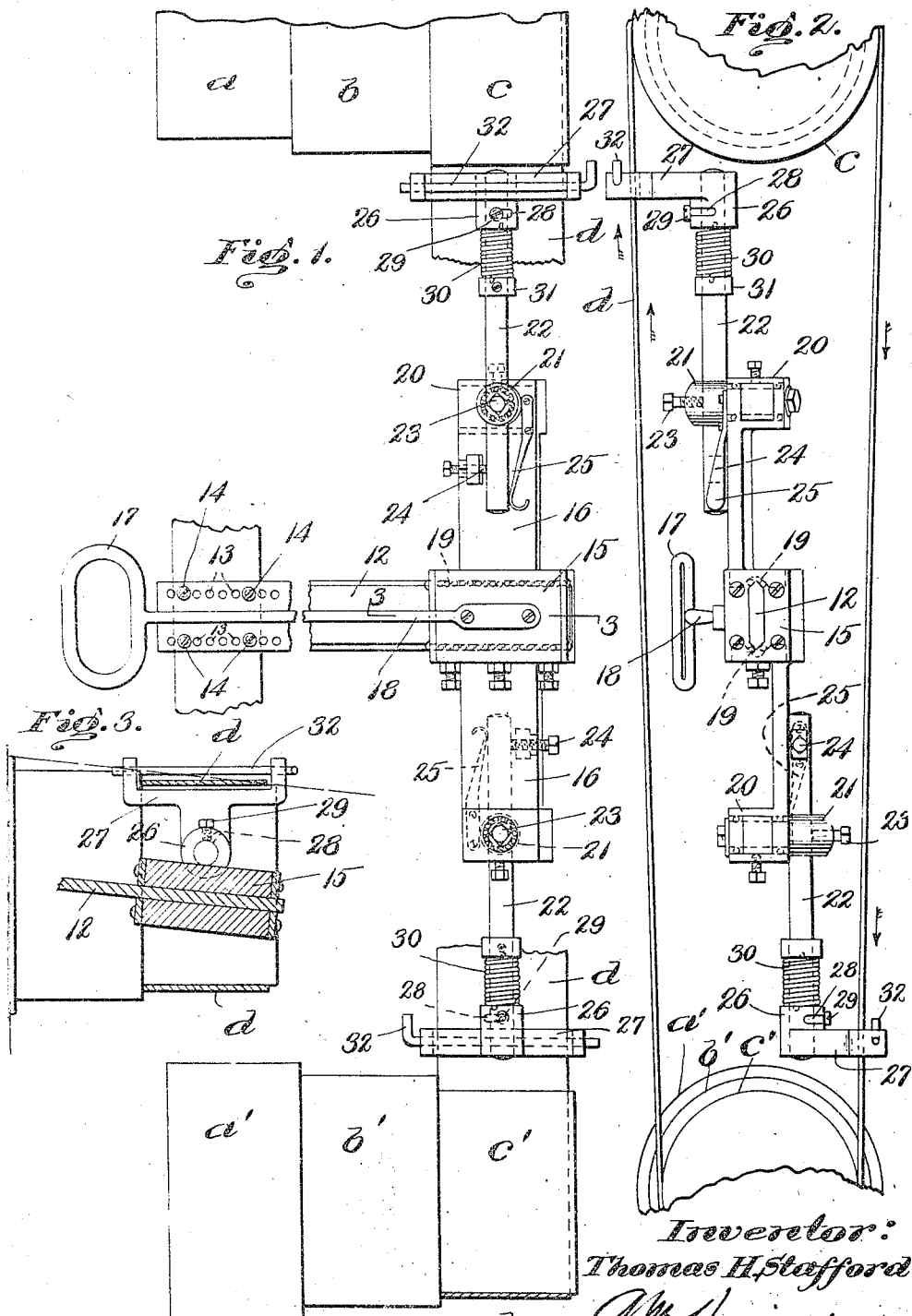
Inventor:
Thomas H. Stafford
by A. W. Harrison
Atty.

UNITED STATES PATENT OFFICE.

THOMAS H. STAFFORD, OF FRANKLIN, NEW HAMPSHIRE.

BELT-SHIPPER FOR STEP-PULLEYS.

1,198,876.

Specification of Letters Patent. Patented Sept. 19, 1916.

Application filed April 1, 1916. Serial No. 88,297.

*To all whom it may concern:*

Be it known that I, THOMAS H. STAFFORD, of Franklin, in the county of Merrimack and State of New Hampshire, have invented certain new and useful Improvements in Belt-Shippers for Step-Pulleys, of which the following is a specification.

This invention relates to means for changing speed of machinery by means of step pulleys, sometimes called "cone" pulleys.

The object of my invention is to provide means whereby the belt connecting two step pulleys may be quickly shifted from one step to another, in either direction, the construction being such that the two belt guides which, of course, are located quite close to those portions of the pulleys onto which the belt is running, may be shifted in such manner that one will act first to take the belt from a higher to a lower step, thereby reducing the tension of the belt, this action being followed by an automatic movement of the other guide to mount the belt onto a step higher than the one on to which it has been running.

The invention is applicable to any machine requiring the use of step or cone pulleys of the type referred to.

My invention consists in the improvements which I shall now proceed to describe and claim.

Of the accompanying drawings: Figure 1 is an elevation of a shipper embodying my improvements, portions of the belt being illustrated as mounted upon the high step of the upper or drive pulley and upon the low step of the lower pulley supposed to be employed for running any desired machine. Fig. 2 is an elevation from the right of Fig. 1. Fig. 3 represents a section on line 3—3 of Fig. 1.

Similar reference characters indicate similar parts in all of the views.

A horizontal support or slideway 12 is adjustably connected to any suitable upright or portion of the frame of the machine to which the shipper is applied, such adjustment being illustrated as effected by means of two rows of holes 13 formed in one end of the slideway 12, screws 14 passing through said holes into such upright or frame. For a reason hereinafter described the slideway 12 is oblique relatively to the plane of the axes of the two pulleys, the upper pulley comprising steps $a$, $b$, $c$, and the lower pulley comprising steps $a'$, $b'$, $c'$. The belt is indicated at $d$.

The block or hub 15 having arms 16 and preferably provided with a suitable operating handle 17 connected to the block or hub by an arm 18, is mounted to slide longitudinally of the support 12. To render the adjustment easy I may provide ball bearings as indicated at 19.

As the parts carried by each arm 16 are duplicates of each other, I will now proceed to describe one set. Mounted to oscillate in a housing 20 at the outer end of the arm 16 is a stud 21. Preferably ball bearings are employed in the housing as indicated by dotted lines in Fig. 2. The head of the stud is vertically apertured to receive the lever 22, a binding screw 23 passing through said head against the lever to hold said lever and permit of adjustment of said lever to vary the distance of the belt guide from the slideway 12.

An adjustable stop 24 which may comprise a screw mounted in a lug of the arm 16, limits the movement of the lever 22 in one direction, a spring 25 holding the inner end of the lever normally against said stop but so as to permit the lever to yield. Mounted to oscillate on the outer end of the lever 22 is a hub 26 of a belt guide 27, said hub having a short slot 28 through which a stop pin or screw 29 passes into the lever 22 to limit the swinging movement of the guide 27 about the axis of lever 22. A spring 30 coiled about the lever 22 and connected at one end to the hub 26 and at the other end to a collar 31 suitably secured to the lever 22 normally holds the belt guide in the position indicated in the drawings.

As best shown in Fig. 3, the fork of the belt guide is quite shallow, a cross pin 32 being employed to avoid any risk of the belt jumping or being swung out of the guide. I am able to employ the shallow belt guides just described because of the obliquity of the slideway 12, said slideway being substantially parallel with the plane of the side of the lower pulley on to which the belt is running, and also substantially parallel with the plane of the side of the upper pulley on to which the belt is running, such running being in the direction of the arrow in Fig. 2. In other words the slideway 12, when the shipper is adjusted, moves in a plane substantially parallel with a plane coinciding with the surfaces of both pulleys on to which the belt runs.

It will be observed that each lever 22 is capable of yielding in one direction, against the pressure of the spring 25, in a plane which is substantially parallel with the plane of movement of the ongoing portions of the belt when said belt is being shifted from a smaller to a larger step, or in other words, from a low to a high step. Of course, during such shifting the other guide is to act to remove the belt from a high to a low step. To explain this, let it be supposed that the belt is to be shifted from steps $c$ $c'$ to steps $b$ $b'$. The operator, by means of the handle 17 or otherwise, shifts the hub 15 toward the left. The upper lever 22 remains practically rigid with the arm 16 because the stop 24 prevents the lever from oscillating as the right hand portion of the upper guide 27 begins to act upon the edge of the belt, and the guide 27 cannot swing on the lever 22 because the pin 29 is at the end of the slot 28 as shown in the drawings. Therefore the shifting of the belt off from step $c$ begins immediately. Since the shifting motion of the lower portion of the belt is resisted by the right hand edge of step $b'$, the right hand portion of the lower guide 27 is arrested by the belt, the spring 30 permits the lower guide to swing relative to the lever 22, and the lever 22 itself can swing somewhat away from the stop 24, the spring 25 yielding. This swinging movement of the lower guide imparts a sufficient twist to the portion of the belt which is running on to the lower pulley, lifting that edge of the belt which is adjacent the step $b'$ on to said step $b'$, or tending to do so, so that as soon as the upper guide has carried the belt on to the step $b$, and thereby reduced the tension of the belt, the springs 30 and 25 of the lower guide rebound or react in the effort to restore the lower guide to normal position, thereby causing the lower guide to direct the belt on to the step $b'$. Of course the same operation occurs when the belt is to be shifted from steps $b$ $b'$ on to steps $a$ $a'$, and when the shipper is operated in the other direction, as for instance, to carry the belt from steps $a$ $a'$ on to steps $b$ $b'$, the operation of the parts will be exactly the same as just described, excepting that it will be the lower guide which is practically rigid during the shifting movement while the upper guide can yield.

It will now be understood that my device includes rebounding or reacting springs in the sense that they permit each guide to yield when moving in a direction to shift the belt from a low to a higher step so that the other guide (which then does not yield) will act first to shift the belt from a high to a lower step and thus reduce the tension of the belt and permit the spring which had yielded to then react and cause the guide which yielded to move and direct the belt on to the higher step. This operation just described is effected mainly by reason of the springs 25. Preferably I also employ the structure including the springs 30 which rebound or react to twist the portion of the belt that is to be guided on to the higher step to lift that belt on to the higher step without necessitating the employment of any bevel which is sometimes employed between the steps of pulleys of the type described.

I claim:

1. A belt shipper for step pulleys having belt guides adapted to operate alternately, either one being adapted to yield for directing the belt from a low to a high step during the time that the other guide operates to shift the belt from a high to a low step, means being provided whereby each guide imparts a twist to the belt as it approaches a step of larger diameter to lift the edge of the belt onto such step.

2. A belt shipper for step pulleys having belt guides mounted to move back and forth substantially parallel with one side of one series of steps and with the other side of the other series of steps, means being provided whereby each guide imparts a twist to the belt as it approaches a step of larger diameter to lift the edge of the belt onto such step.

3. A belt shipper for step pulleys comprising a shiftable support having a pair of levers yieldingly carried by said support, guides carried by said levers, and means for opposing movement of the levers in one direction while permitting yielding movement in the other direction, means being provided whereby each guide imparts a twist to the belt as it approaches a step of larger diameter to lift the edge of the belt onto such step.

4. A belt shipper for step pulleys having a belt guide movable in a direction to shift the belt from one step to another, said guide being yieldingly supported and having means whereby it imparts a twist to the belt as it approaches a step of larger diameter to lift the edge of the belt on to such step.

5. A belt shipper for step pulleys, comprising a pair of yieldingly mounted belt guides, means for shifting them in a direction to guide the belt onto different steps, and means for preventing either guide from yielding while shifting the belt onto a smaller step whereby one guide will act first and reduce tension on the belt to permit the other guide to then act while recovering its normal position, means being provided whereby each guide imparts a twist to the belt as it approaches a step of larger diameter to lift the edge of the belt onto such step.

6. A belt shipper for step pulleys comprising a support oblique to the plane of the axes of the pulleys, a member adjustable along said support and having arms, levers carried by said arms, and belt guides carried by said levers.

7. A belt shipper for step pulleys comprising a support oblique to the plane of the axes of the pulleys, a member adjustable along said support and having arms, levers carried by said arms, and belt guides mounted to oscillate on said levers, springs and stops being employed to permit the guides to yield in one direction but not in the other direction.

In testimony whereof I have affixed my signature, in presence of two witnesses.

THOMAS H. STAFFORD.

Witnesses:
JOHN F. WOODWARD,
SAMUEL B. CHADWICK.